July 15, 1952  F. C. MELCHIOR  2,603,728
SENSITIVE CONTROL AND INDICATING INSTRUMENT
Filed Oct. 11, 1946
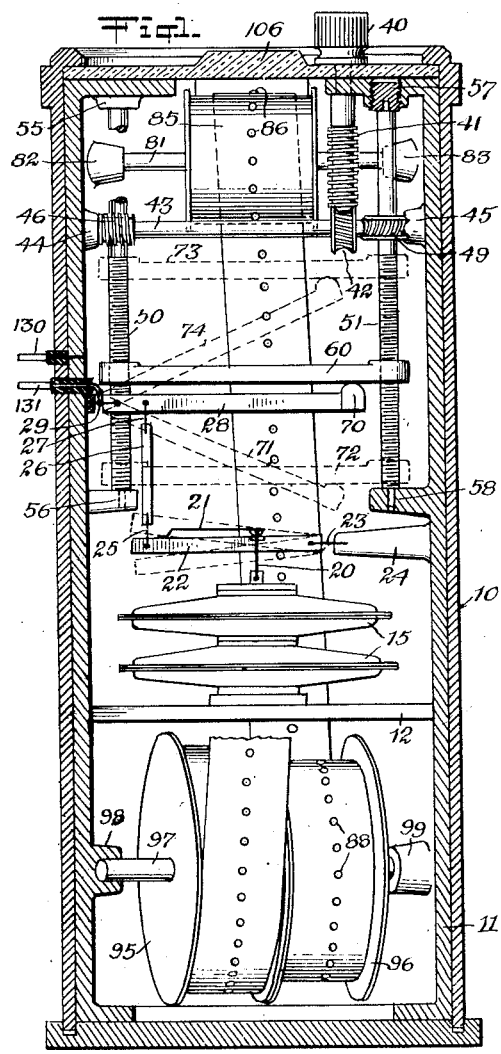
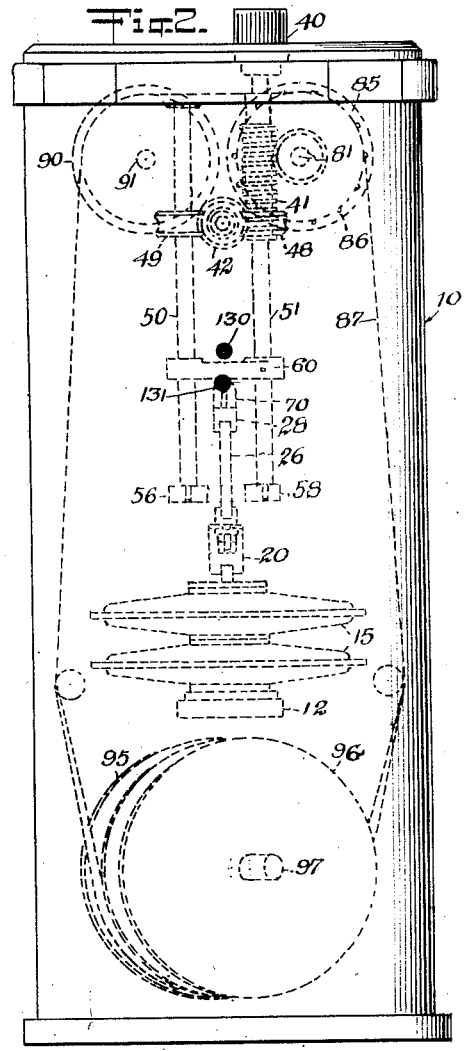
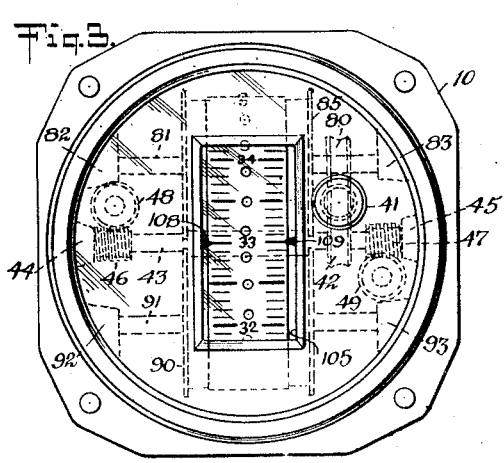
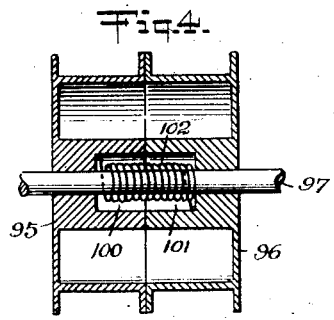
INVENTOR
Frederick C. Melchior
BY
Munn, Liddy & Glaccum
ATTORNEYS Patented July 15, 1952

2,603,728

UNITED STATES PATENT OFFICE 2,603,728

SENSITIVE CONTROL AND INDICATING INSTRUMENT

Frederick C. Melchior, New York, N. Y., assignor of one-half to Effie B. Melchior, New York, N. Y.

Application October 11, 1946, Serial No. 702,665

4 Claims. (Cl. 200—83)

This invention relates to sensitive instruments which are adapted to control other instruments or machines in automatic response to certain stimuli or conditions and to indicate control process and its status to an observer.

The invention relates to instruments, more particularly of the pressure sensitive type, in which the motion of capsules, bellows or other actuating element, registers a given pressure and/or related factors, such as altitude, by means of a suitable mechanism, transmitting and indicating such motion. It also relates to diverse types of measuring, recording and governing instruments in which the sensitive, actuating element may be of the electrical, mechanical or thermal variety where accuracy, sensitivity and readability over a wide operating range are most important.

One object of the invention is to produce a higher order of accuracy than has heretofore been obtainable in conventional types of instruments, by reducing to a minimum the work required to actuate said transmitting mechanism.

Another object of the invention is to provide for optimum sensitivity, by eliminating virtually all friction in the transmission of the aforesaid motion of the actuating elements, thus greatly augmenting the inherent potential accuracy.

A still further object of the invention is to render possible any desired degree of readability—by means of a radically new arrangement permitting of practically unlimited scale length, without dispensing with custom calibration—thereby fully enhancing and utilizing the great inherent accuracy of the basic mechanism.

It is also an object of this invention, through simple and efficient design, to incorporate the foregoing desiderata within the ramifications of bulk and weight commensurate with normal instrument practice as applied to various fields—as, for example, to aircraft installations, where compactness is a prime factor.

Additional objects, as well as the exact nature and scope of the invention, may best be understood from the accompanying drawings embodying the various details of apparatus for carrying the invention into effect, as described in the ensuing specification.

Referring now to said drawings:

Fig. 1 is a broken plan view of a typical instrument designed in accordance with the present invention showing the general arrangement of the various component parts;

Fig. 2 is a longitudinal phantom view at substantially right angles to the view of Fig. 1, showing the pertinent parts in their relative operating positions;

Fig. 3 is a front view thereof; and

Fig. 4 is a sectional view through the reels shown in Figs. 1 and 2 showing the mechanism by which relative movement of said reels is controlled.

As may be seen from the drawing, the device chosen to illustrate my invention is an instrument of the pressure sensitive type in which capsules responding to pressure changes comprise the actuating element. It is to be noted that the exact nature and design of the subject device will in no way affect the scope and usefulness of my invention which can be used in connection with any type of measuring, indicating and governing instrument where accuracy, sensitivity and readability are of paramount importance. Such devices may refer to highly diversified applications, such as thermal measurements and recordings, thermostatic and combustion control; electrical instruments for measuring and governing over a wide range and with optimum accuracy a number of factors such as voltage, amperage, magnetic and induction forces; mechanical measurements and recordings for weight balances, precision scales, etc. The illustration as here presented is, therefore, only to be construed as an example of what I consider a simple and logical application of the basic principle of the invention, embodying in its execution what I believe to be a preferred structure, and it must in no case be interpreted as constituting any limitation relative to scope and usefulness of the invention as it is hereinafter set forth.

Turning now to Figs. 1 and 2, it will be seen that the instrument here illustrated is housed in a conventional case 10 that may well be used for installation in various types of instrument panels. It is also worthy of note that, while size is irrelevant to the nature and scope of the invention, the inherent arrangement of this design permits of easy fulfillment of the foregoing objects within the space of standard aircraft instrument dimensions.

Within casing 10 is a rigid framework 11 which supports the mechanism hereinafter described. Cross member 12 is affixed to said frame and pressure sensitive capsules 15 are mounted on said cross member. These capsules are arranged in series and they are joined together by any suitable method such as welding or hard soldering. The same method or means may be used to anchor them, and more particularly the lower of the two, to the cross member 12. The number of capsules to be used is determined largely by the range of motion and the power desired for the operation of the transmitting mechanism. In the illustrative instrument herein described two capsules are adequate. These capsules provide the force or motive power by which the construction is actuated. The instrument is set by another mechanism which will hereinafter be described.

It will be noted in the drawing that the lower or rear capsule 15 is the one which is directly connected to the cross member 12. The upper or forward capsule 15 is provided with a strip 20 which extends forwardly therefrom. This strip is adapted to actuate the lever mechanism hereinafter described. More particularly it constitutes the link between the capsule series and the leverage mechanism and it enables the capsules to actuate the lever mechanism. This strip 20 is made of spring metal. The flexibility or resilience of this strip is such that the force applied by the capsules through the strip upon the lever mechanism is inadequate to buckle or collapse the strip. In other words the strip is sufficiently rigid to resist buckling under the force exerted by the capsules. On the other hand it is sufficiently flexible to enable it to follow the movement of the lever mechanism hereinafter described.

The free end of spring member 20 is connected to a transversely disposed spring member 21. The properties of this last-mentioned member are substantially the same as those of spring strip 20. Both, for example, may be made of beryllium copper or stainless steel or a similar metal. The opposite end of spring strip 21 is connected to one end of a transversely extending bar 22. The opposite end of said bar is hingedly connected by means of a spring strip 23 to a projection 24 of the frame 11. Again the properties of spring strip 23 resemble those of members 21 and 20. Attached to the first-mentioned end of bar 22 is another spring strip 25. Connected to spring strip 25 is a longitudinally extending bar 26. Still another spring strip 27 is connected to the opposite end of bar 26 and the free end of said last-mentioned spring strip is connected to a transversely extending contact bar 28. This contact bar is hingedly connected to the side frame 11 by means of still another spring strip 29.

Members 21, 22, 23, 25, 26, 27, 28 and 29 comprise the lever mechanism hereinabove mentioned. It will be evident, particularly from Fig. 1 of the drawing, that when the capsules are caused to expand in a rarefied atmosphere, a forward motion will be imparted by means of the spring strip 20 to the lever mechanism as a whole. More specifically such forward movement of spring strip 20 will cause a forward pivotal movement of bar 22, a second forward movement of bar 26 and finally a forward pivotal movement of contact bar 28. Conversely where increased pressure upon the outer surfaces of the capsules 15 causes them to contract, the strip 20 will pull back upon the mechanism last-above described in the following manner: The bar 22 will be pulled back on its pivot 23 thereby pulling bar 26 with it and causing contact bar 28 to move backwardly upon its pivot 29.

The pressure sensitive mechanism is hereinabove described. The setting and indicating mechanism will now be described. A knob 40 at the front end of casing 10 is the means by which the setting and indicating mechanism may be operated. This knob is connected to a worm 41 which engages a worm gear 42. This worm gear is fixedly mounted on a transversely extending shaft 43. The shaft is freely rotating on bearings 44 and 45 connected to the frame 11. Affixed to shaft 43 is a pair of worms 46 and 47. These worms mesh with a pair of worm gears 48 and 49 mounted, respectively, on screw threaded rods 50 and 51. These screw threaded rods extend longitudinally of the casing and their ends are mounted for rotation in bearings 55, 56, 57 and 58 attached to the frame 11. A cross bar 60, which may be designated as the second contact bar, is provided with two threaded holes at its opposite ends, and this bar is mounted by means of said holes upon the threaded rods 50 and 51.

It will be appreciated from the foregoing that when the knob 40 is turned by the operator, the worm 41 will cause the worm gear 42 to rotate. Since the latter gear is fixedly mounted on the shaft 43, this will cause a corresponding rotary movement of the worms 46 and 47 of said shaft 43. And since these latter two worms mesh with worm gears 48 and 49 of shafts 50 and 51, these latter worm gears 48 and 49 and their respective shafts will be caused to rotate. Since the bar 60 rides on said threaded shafts, rotary movement of the latter will cause movement of the bar 60 longitudinally of the casing 10. This movement may be forward or backward as the dotted lines in Fig. 1 indicate.

It will be seen in Fig. 1 that contact may be made between the first contact bar 28 and the second contact bar 60. Actually a small boss or forwardly extending projection 70 at the free end of the first contact bar 28 provides the contact means between said contact bars. If it be assumed for the moment that contact bar 60 is set in the position indicated by the solid lines in Fig. 1, and if it be further assumed that increased pressure upon the outer surfaces of the capsules 15 retracts the first contact bar 28 to the lowermost position thereof as indicated by the dotted lines 71 in Fig. 1, it will be appreciated that contact will be broken between said two contact bars. It will not be until decreased pressure upon the outsides of the capsules will allow said capsules to push the first contact bar 28 to the solid line position of Fig. 1, that contact will be made with contact bar 60. On the other hand should contact bar 60 be set in the position indicated by the dotted lines 72, contact will be made between the two contact bars when contact bar 28 is in the position indicated by character reference 71. Should, however, the contact bar 60 be set in the position indicated by the dotted lines marked 73, contact will not be made until further decreased pressure upon the capsules 15 will allow said capsules to push the contact bar 28 to the position of dotted lines 74.

It will be seen in Fig. 1 that worm 41 is a rather long member, and it will be seen in Fig. 3 that it not only engages worm gear 42, but also a second worm gear 80. This latter worm gear is mounted on a transversely extending shaft 81 which rotates freely in bearings 82 and 83 carried by frame 11. Fixedly mounted on shaft 81 is a reel 85.

It will be seen from the foregoing that when knob 40 is turned by the operator, the worm 41 to which it is connected will cause worm gear 80 and hence shaft 81 and the reel 85 which is thereon mounted to rotate. It will be evident from the foregoing, therefore, that the knob 40 actuates two mechanisms. One is the mechanism by which the contact bar 60 is moved, and the other is the mechanism by which the reel 85 is turned. Since it is the same worm 41 which actuates both mechanisms, it will be understood that the rotary movement of the reel 85 will correspond to the lineal movement of the contact bar 60.

Reel 85 is provided with a plurality of radially extending projections 86 which extend along a common circumferential line. These projections enable the reel 85 to act as a sprocket by which an indicating tape 87, having perforations 88 formed therein, may be engaged and advanced in either direction. In other words the projections 86 are adapted to enter the perforations 88 and when the sprocket reel 85 is caused to rotate as above described, corresponding movement of the tape 87 will be caused. That is rotation of the sprocket reel in one direction will cause movement of the tape in the same direction and rotation of the sprocket reel in the opposite direction will cause corresponding movement of said tape in said opposite direction.

Reference to Figs. 1 and 2 will show that there are four reels altogether in the instrument under description. Adjacent sprocket reel 85 is an idling reel 90. It will be noted in Fig. 3 that idling reel 90 is mounted on a shaft 91 which rotates in bearings 92 and 93 connected to frame 11, and that shaft 91 is parallel to shaft 81. These two reels 85 and 90 are mounted at the front end of the instrument. At the back end is a pair of reels 95 and 96, respectively, these latter reels being mounted on a common shaft 97 which freely rotates in bearings 98 and 99 connected to the sides of the frame 11. The tape 87 is connected at one end to reel 95 and at its other end to reel 96. It extends from reel 95 around reel 90, thence around reel 85 and finally to reel 96. It will be understood from the foregoing that when sprocket reel 85 is caused to rotate as above described, the tape 87 will be caused to unwind from one of reels 95 and 96 and to reel on the other of said reels. The direction in which sprocket reel 85 is caused to rotate will determine which of the reels 95 and 96 will feed the tape and which will receive it.

Fig. 4 will show that reels 95 and 96 are provided with recesses 100 and 101 which accommodate a coiled spring 102. This spring is attached at one end to reel 95 and at the other end to reel 96. Its function is to resist movement of either of these two reels relative to the other. In consequence they cause the tape 87 to remain in a relatively taut condition at all times. It will be seen in Figs. 1 and 3 that at the front end of casing 10 is a window 105. This window is fitted with a magnifying lens 106 through which the tape may be viewed. The tape in the embodiment shown on the drawing is provided with calibrations designated by numbers 32, 33 and 34 on the tape in Fig. 3. These calibrations may be viewed through the window and through the magnifying lens. It will be appreciated that the tape may carry other calibrations designated in a different manner, depending upon the purpose for which the instrument is intended to be used. Index pointers 108 and 109 are provided so that an accurate reading of the tape may be obtained. Parallax in reading is thereby avoided. Thus it is seen that with any desired scale length available optimum readability may be had with this arrangement with respect to any part of the scale.

For the foregoing it will be understood that any position of the tape always corresponds to a given position of the contact member 60. More specifically any given reading will correspond to a pre-determined position of the contact member 60. Thus it is obvious that every inch of tape 87 can be custom calibrated so as to conform precisely with the motion of the actuating elements thereby avoiding discrepancies inherent in the multi-revolution instruments, where, on the clock principle, the large hand denotes, for example, 1,000 ft. of altitude for each revolution. Inasmuch as no capsules or bellows are accurately following a straight line or pre-determined graph, it is obvious that such multi-revolution instruments are subject to considerable error, whereas with the subject arrangement custom calibration will insure optimum accuracy over the entire operating range.

Referring now to a specific application, in order to better clarify the functioning and usefulness of this device, we may visualize it as an aircraft instrument—in the nature of an absolute altimeter—installed on an aircraft instrument panel in a manner similar to that of a conventional altimeter. In this role it would then serve a three-fold purpose:

1. Connected to the automatic pilot, it would govern constant pressure altitude flying for accurate and safe vertical spacing of aircraft along the airways, as well as in circling airports pending let-down for landing, according to directions and pertinent regulations.

2. As a landing altimeter it would indicate by means of visual and/or audible signal when a pre-selected height above the ground has been reached while descending in the final approach for landing.

3. Equipped with a servo unit—which may be engaged or disengaged at will by means of a switch in the manually setting knob—it will serve as a self-indicating altimeter along conventional lines of operation, yet retaining the two foregoing optional duties, which may be instantly effected in the same instrument by a mere pull or a push on the aforesaid manual knob.

In order to adapt the instrument above-described to the specific application first-above mentioned, the contact members 60 and 28 should be connected by means of electrical conductors 130 and 131 and conventional relay to the servo unit of the automatic pilot. More precisely conductor 130 is connected to the frame 11 which acts as a ground to which the contact member 60 is connected. The conductor 131 is connected to the strip 29. The circuit then may be indicated as follows: conductor 130, frame 11, bearing 44 for example, shaft 43, worm 46, worm gear 48, threaded shaft 50, contact bar 60, contact bar 28, strip 29 and finally conductor 131. It will be evident therefore that when the two contact members engage each other, the servo unit will be actuated in one way, and when they are disengaged from each other the servo unit will be actuated in another way. This will be rendered clear from the following description of the procedure involved:

After take-off and initial climb, control and power settings are adjusted so as to stabilize normal airline climb to cruising altitude at desired rate. The automatic pilot is then engaged, and knob 40 is turned until said altitude is read between the index pointers. Contact members 60 and 28 are connected to the servo unit of the automatic pilot in such manner that contact "off" works elevators "up"—while contact "on" works elevators "down." The plane will continue climbing until contact is made at the selected altitude. The servo unit will then cause the plane to level off and constant pressure altitude is maintained within the narrow margin of a few feet while a compensating damping device prevents over-control.

For descending to a pre-selected lower altitude, the reverse procedure is as follows: After control and power settings have been adjusted for desired rate of descent, knob 40 is turned to adjust the scale reading to the selected altitude causing contact bar 60 to depress the free end of contact lever 28. This motion is transmitted to lever 22 in a manner obvious from the illustration and the overload causes the spring 21 to yield and bend with consequent tension maintained on the entire leverage system. Thus contact is maintained until the selected lower altitude is reached, whereupon the "off" and "on" motion again maintains constant pressure altitude through action of the servo unit.

For use in instrument landings, this device would operate independently of the automatic pilot which would normally be disengaged in the final approach. A last minute check of the field elevation in terms of absolute pressure altitude is obtained from the control tower, whereupon knob 40 is turned until the scale reads such altitude plus a margin of, say, 30–40 feet (including cockpit height above the ground). When this pre-set altitude is reached, contact is broken and a visual signal (red flash) as well as an audible one will indicate the proper moment to reduce the rate of descent by levelling off from a normal of, say 600 feet per minute to about 200 or 250 F. P. M., at which rate comfortable landing is quite feasible.

For diverse applications and purposes the subject invention offers considerable variation with regard to type and nature of actuating and transmitting elements. In addition to the foregoing example it may therefore be well to here mention a few more logical uses.

As a master instrument for calibration purposes, this device offers—in addition to merits outlined in the objects of the invention—the following distinct advantages:

1. It dispenses with the necessity of more than one operator, thereby saving manpower.

2. It reduces the error in the reactions of two operators who are endeavoring, in current practice, to record a given pressure through timed visual observation of two separate pointers.

3. It augments the efficiency, speed and accuracy of the work of the operator, in that a preselected pressure on a large easily readable scale is much more readily and accurately matched by means of a visual light signal, than by visual observation of a pointer over a relatively crowded scale.

As an altimeter for surveying work—which should preferably be done in the relatively calm and cool atmosphere of night—it offers advantages which should be self-evident. Carried at waist height (accurately measured) its large scale, illuminated from within by means of a small battery and bulb, is easily read. The attainment of any pre-selected altitude is instantly signalled and, conversely, the height of any given spot is easily and quickly found—the light signal being so arranged as to be visible at considerable distance when desired. By the same token, this instrument will enable the surveyor to "walk the contour lines" by merely watching the light go on and off at a pre-set altitude.

For applications to other fields it is also evident that the subject device need not be confined to operation through contact points and electric relay, as herein illustrated. For a governor (pressure, temperature, voltage and amperage, etc.) where optimum accuracy over a wide range is required, contact lever 28 may equally well mount a magnet which would thus move into and out of an induction coil on cross bar 60. By the same token, the actuating element itself may be a thermostatic element for temperature control—working either through contact points and relay—or, it may be entirely dispensed within favor of electrical elements for control of power, R. P. M., or related factors.

No such variations will affect the principle of the subject invention, and it is possible that further analysis may bring to light additional applications and advantages.

It should be clearly understood that the invention herein described is not limited to a manually settable—or manually operable instrument, but instead it may be equally well adapted to the requirements of a self-indicating instrument. Nor is the present invention limited to pressure sensitive means for actuating the same. The invention is sufficiently broad to encompass any actuating means. The specific transmitting means shown in the drawing and described in the specification should also be viewed as illustrative rather than definitive. And the same may be said of the indicating means.

I claim:

1. A sensitive control and indicating instrument comprising a casing, a window in said casing, an elongated calibrated tape movable along its length opposite said window, issuing and receiving reels for said tape, manually operable means for moving said tape along its length to predetermined readings, a pair of cooperating contact members movable relative to each other, into contact with each other or out of contact with each other, one of said contact members being actuated by the same manually setting means which sets the tape whereby said first-mentioned contact member may be selectively set in positions corresponding to the tape readings, said second contact member being actuated by at least one pressure capsule whereby contact will be made by said second contact member with said first contact member at a pressure which will be determined by the setting of the first-mentioned contact member.

2. A sensitive control and indicating instrument, including a casing, a pair of storage drums mounted at one end of said casing, a pair of reels mounted at the opposite end of said casing having tape engaging means, a relatively long calibrated tape mounted on said storage drums and engaging said reels, manually operated means for turning said reels, a pair of contact members in said instrument mounted for movement into contact with each other and out of contact with each other, actuating means causing one of said contact members to move toward or away from the other contact member, said actuating means being sensitive to predetermined stimuli, said second contact member being manually adjustable by the same adjusting means that adjusts said reel and being mechanically synchronized with said reel whereby movement of said reel with said calibrated tape therein will automatically cause the movement of said contact member toward or away from said first mentioned contact member.

3. A sensitive control indicating instrument, comprising a casing, a pair of tape storage drums mounted in said casing, a reel mounted in said casing and a calibrated tape running from said storage drums over said reel, a pair of electrical contact members, one of said members being mechanically connected to said reel whereby the movement of said member will cause said reel to rotate and the movement of said reel will cause said contact member to move toward or away from said contact member, actuating means in said casing governing the movement of said second contact member toward or away from said first mentioned contact member, said actuating means being sensitive to a predetermined stimuli, and means for transmitting the effect of the meeting of said contact members to a source outside said instrument.

4. In a sensitive control indicating instrument, a casing, a reel, a calibrated tape movable over said reel, means between said reel and said tape to prevent slippage therebetween, means for storing said tape and keeping it under tension, a contact member mounted across said instrument, mechanical means between said reel and said contact element synchronizing the movement one with the other, a second contact element pivoted in said casing, actuating means for causing said second contact member to move toward and away from said first mentioned contact member, said actuating means being sensitive to a predetermined stimuli, said first mentioned contact member being manually adjustable as to its position relative to a predetermined norm, any movement of said scale on said reel being synchronized with the movement of said first mentioned contact member whereby the readings on the scale correspond to the position of said first mentioned contact member.

FREDERICK C. MELCHIOR.

REFERENCES CITED

The following references are of record in the file of this patent:

UNITED STATES PATENTS

| Number | Name | Date |
|---|---|---|
| 747,297 | Bristol | Dec. 15, 1903 |
| 1,258,161 | Spear | Mar. 5, 1918 |
| 1,290,928 | Denison | Jan. 14, 1919 |
| 1,629,710 | Klopsteg et al. | May 24, 1927 |
| 1,860,678 | Langley | May 31, 1932 |
| 2,058,641 | Slonczewski | Oct. 27, 1936 |